United States Patent [19]
Tanimura et al.

[11] Patent Number: 5,837,781
[45] Date of Patent: Nov. 17, 1998

[54] THERMALLY STABLE POLYOXYMETHYLENE COPOLYMER

[75] Inventors: Noritaka Tanimura; Yukio Tanigawa, both of Kurashiki, Japan

[73] Assignee: Asahi Kasei Kogyo Kabushiki Kaisha, Japan

[21] Appl. No.: 804,507

[22] Filed: Feb. 24, 1997

[30] Foreign Application Priority Data

Mar. 12, 1996 [JP] Japan .................................. 8-0544442

[51] Int. Cl.$^6$ ............................. C08L 61/02; C08G 4/00; C08G 6/00
[52] U.S. Cl. .......................... 525/398; 528/232; 528/240; 528/241
[58] Field of Search ..................... 528/232, 240, 528/241, 242; 525/398

[56] References Cited

U.S. PATENT DOCUMENTS 4,579,935 4/1986 Kasuga et al. .

FOREIGN PATENT DOCUMENTS

| | | |
|---|---|---|
| A1-128739 | 12/1984 | European Pat. Off. . |
| B-3-63965 | 10/1991 | Japan . |
| A-7-286023 | 10/1995 | Japan . |
| A-7-286027 | 10/1995 | Japan . |

*Primary Examiner*—Duc Truong
*Attorney, Agent, or Firm*—Pennie & Edmonds LLP

[57] ABSTRACT

A polyoxymethylene copolymer prepared by copolymerizing a mixture comprising trioxane and 1,3-dioxolane in the presence of at least one polymerization catalyst selected from the group consisting of boron trifluoride, a boron trifluoride hydrate and a coordination complex compound of an organic compound containing an oxygen atom or a sulfur atom with boron trifluoride, wherein the 1,3-dioxolane has a 2-methyl-1,3-dioxolane content of not more than 500 ppm by weight and a 1,3-dioxolane peroxide content of not more than 15 ppm by weight in terms of hydrogen peroxide, and contains at least one hindered phenol in an amount of from 10 to 500 ppm by weight, each based on the weight of the 1,3-dioxolane.

4 Claims, No Drawings

THERMALLY STABLE POLYOXYMETHYLENE COPOLYMER

FIELD OF THE INVENTION

This invention relates to a thermally stable polyoxymethylene copolymer. Specifically, it relates to a polyoxymethylene copolymer prepared by a copolymerization of trioxane and 1,3-dioxolane, in which the 1,3-dioxolane has a 2-methyl-1,3-dioxolane content of not more than 500 ppm (by weight, hereinafter the same) and a 1,3-dioxolane peroxide content, in terms of hydrogen peroxide, of not more than 15 ppm, and contains from 10 to 500 ppm of at least one hindered phenol, each based on the weight of the 1,3-dioxolane. The present invention provides a polyoxymethylene copolymer having improved thermal stability.

BACKGROUND OF THE INVENTION

A process for producing a polyoxymethylene copolymer comprising copolymerizing trioxane and 1,3-dioxolane in the presence of at least one polymerization catalyst selected from the group consisting of boron trifluoride, a boron trifluoride hydrate and a coordination complex compound of an organic compound containing an oxygen atom or a sulfur atom with boron trifluoride is known in the art, but the polyoxymethylene copolymer obtained by the process does not provides for sufficient thermal stability.

In general, factors which cause reduction in thermal stability of a polyoxymethylene copolymer include oxidative decomposition of the copolymer.

Oxidative decomposition of a polyoxymethylene copolymer occurs during a polymerization reaction and during a post processing such as separation of the unreacted monomers, washing, drying, etc. In an attempt to inhibit a reduction in polymerization yield, which has been a problem involved in general processes for producing polyoxymethylene copolymers, JP-B-3-63965 (the term "JP-B" used herein means an "examined Japanese patent publication") corresponding to EP-128739A1 and U.S. Pat. No. 4,579,935 discloses addition of a hindered phenol to monomers prior to the polymerization to thereby inhibit not only main chain decomposition during polymerization but also oxidative decomposition during the post processing of the polymerization. Further, JP-A-7-286023 (the term "JP-A" used herein means an "unexamined published Japanese patent application) discloses a process for producing a thermally stable polyoxymethylene copolymer which comprises copolymerizing trioxane and a cyclic ether, wherein a hindered phenol is added to the cyclic ether to inhibit an increase in a peroxide content thereof. However, these processes still fail to provide polymers having sufficient thermal stability.

SUMMARY OF THE INVENTION

An object of the present invention is to provide a polyoxymethylene copolymer having improved thermal stability by effectively inhibiting oxidative decomposition.

Other objects and effects of the present invention will be apparent from the following description.

The inventors of the invention conducted extensive study, paying attention to the fact that the insufficient thermal stability of a conventional polyoxymethylene copolymer obtained by copolymerizing trioxane and 1,3-dioxolane is due to an oxidative decomposition. As a result, they have unexpectedly found that the oxidative decomposition of polyoxymethylene is largely influenced by 2-methyl-1,3-dioxolane present in a 1,3-dioxolane comonomer and a derived peroxide originated from 1,3-dioxolane (hereinafter simply referred to as a "peroxide") and thus achieved the present invention.

That is, the above objects of the present invention have been achieved by providing a polyoxymethylene copolymer prepared by copolymerizing a mixture comprising trioxane and 1,3-dioxolane in the presence of at least one polymerization catalyst selected from the group consisting of boron trifluoride, a boron trifluoride hydrate and a coordination complex compound of an organic compound containing an oxygen atom or a sulfur atom with boron trifluoride, wherein the 1,3-dioxolane has a 2-methyl-1,3-dioxolane content of not more than 500 ppm by weight and a 1,3-dioxolane peroxide content, in terms of hydrogen peroxide, of not more than 15 ppm by weight, and contains at least one hindered phenol in an amount of from 10 to 500 ppm by weight, each based on the weight of the 1,3-dioxolane.

DETAILED DESCRIPTION OF THE INVENTION

The present invention is described in detail below.

The 2-methyl-1,3-dioxolane content in the 1,3-dioxolane for use in the present invention should be not more than 500 ppm, and preferably not more than 300 ppm. If the 2-methyl-1,3-dioxolane content in the 1,3-dioxolane exceeds 500 ppm, the resulting polyoxymethylene copolymer has poor thermal stability. This is because 2-methyl-1,3-dioxolane is introduced into the main chain of the resulting copolymer by the copolymerization reaction, and the methyl group introduced into the main chain accelerates oxidative decomposition of the copolymer, to thereby deteriorate thermal stability. 1,3-Dioxolane having a 2-methyl-1,3-dioxolane content of not more than 500 ppm can be obtained by subjecting 1,3-dioxolane as synthesized to precise distillation. Because of a small difference in boiling point between 1,3-dioxolane and 2-methyl-1,3-dioxolane, a single distillation step of 1,3-dioxolane as synthesized is insufficient to achieve the above specified content of 2-methyl-1,3-dioxolane content. 1,3-Dioxolane having a 2-methyl-1,3-dioxolane content of not more than 500 ppm can be obtained by distilling 1,3-dioxolane as synthesized at least twice.

In addition to the requirement that the 2-methyl-1,3-dioxolane content should be not more than 500 ppm, and preferably not more than 300 ppm, the 1,3-dioxolane for use in the invention is required to have a peroxide content of not more than 15 pm, preferably not more than 5 ppm, in terms of hydrogen peroxide (the "peroxide content in terms of hydrogen peroxide" is hereinafter simply referred to as a "peroxide content"). If the peroxide content exceeds 15 ppm, the resulting polyoxymethylene copolymer has poor thermal stability. If the peroxide content exceeds 15 ppm even with the 2-methyl-1,3-dioxolane content being 500 ppm or lower, or if the 2-methyl-1,3-dioxolane content exceeds 500 ppm even with the peroxide content being 15 ppm or lower, the resulting polyoxymethylene copolymer has poor thermal stability.

It is also required that the 1,3-dioxolane for use in the present invention contains from 10 to 500 ppm, preferably from 50 to 300 ppm, of a hindered phenol. The hindered phenol is added for preventing an increase of the peroxide content. A purified 1,3-Dioxolane by distillation contains a trace amount of a peroxide. The peroxide content increases at an accelerated rate during storage to exceed 15 ppm. Therefore, it is necessary to add a hindered phenol immediately after the distillation purification, i.e., by the time where the peroxide content reaches 15 ppm, preferably 5 ppm. If the amount of the hindered phenol that is added to 1,3-dioxolane is less than 10 ppm, the increase of the peroxide content at an accelerated rate cannot be prevented. If it exceeds 500 ppm, the activity of the polymerization catalyst is deteriorated, resulting in a reduced polymerization yield. If the peroxide content exceeds 15 ppm even with the 2-methyl-1,3-dioxolane content being 500 ppm or lower, or if the 2-methyl-1,3-dioxolane content exceeds 500 ppm even with the peroxide content being 15 ppm or lower, the addition of 10 to 500 ppm of a hindered phenol results in providing a polyoxymethylene copolymer having poor thermal stability.

The hindered phenol for use in the present invention includes compounds commonly used as antioxidants or as free radical scavengers in the field of plastics. Specific examples thereof include 2,2-methylenebis(4-methyl-6-t-butylphenol), hexamethylene glycol bis(3,5-di-t-butyl-4-hydroxyhydrocinnamate), tetrakis(methylene(3,5-di-t-butyl-4-hydroxyhydrocinnamate))methane, triethylene glycol bis(3-(3-t-butyl-4-hydroxy-5-methylphenyl) propionate), 1,3,5-trimethyl-2,4,6-tris(3,5-di-t-butyl-4-hydroxybenzyl)benzene, 4,4-methylenebis(2,6-di-t-butylphenol), octadecyl 3-(3,5-di-t-butyl-4-hydroxyphenyl) propionate, distearyl 3,5-di-t-butyl-4-hydroxybenzylphosphonate and 2-t-butyl-6-(3-t-butyl-5-methyl-2-hydroxybenzyl)-4-methylphenyl acrylate.

Of these hindered phenols, those soluble in 1,3-dioxolane are preferred from the viewpoint of handling. Tetrakis (methylene(3,5-t-butyl-4-hydroxyhydro-cinnamate)) methane (Irganox 1010, produced by Ciba-Geigy, Ltd.) is particularly preferred.

As described above, the 1,3-dioxolane for use in the copolymerization with trioxane in the invention is 1,3-dioxolane containing 10 to 500 ppm, preferably 50 to 300 ppm, of a hindered phenol, having a peroxide content of not more than 15 ppm, preferably not more than 5 ppm (in terms of hydrogen peroxide), and having a 2-methyl-1,3-dioxolane content of not more than 500 ppm, preferably not more than 300 ppm. The 1,3-dioxolane monomer is generally used in an amount of 10 mol % or less based on the molar amount of trioxane that is used as a main monomer.

The polymerization catalyst for use in the present invention is at least one compound selected from the group consisting of boron trifluoride, a boron trifluoride hydrate, and a coordination complex compound of an organic compound containing an oxygen atom or a sulfur atom with boron trifluoride. The catalyst can be used in a gaseous state or as a solution in an appropriate organic solvent. A particularly preferred polymerization catalyst is a coordination complex compound of boron trifluoride, such as boron trifluoride diethyl etherate and boron trifluoride dibutyl etherate.

The polymerization catalyst is generally used in an amount of $3\times10^{-6}$ to $10\times10^{-5}$ mol, preferably $5\times10^{-6}$ to $5\times10^{-5}$ mol, more preferably $5\times10^{-6}$ to $2\times10^{-5}$ mol, per mole of the total monomers. If the amount of the catalyst is less than $3\times10^{-6}$ mol per mol of the total monomers, the polymerization reaction rate becomes considerably low, causing such problems that a larger scale of the polymerization apparatus is necessitated, which is unsuitable to practical use. If the catalyst amount is more than $10\times10^{-5}$ mol per mol of the total monomers, side reactions take place, making it difficult to produce a high-molecular weight polyoxymethylene copolymer. Moreover, in the treatment for removal of instable terminals described below, the polyoxymethylene copolymer produced tends to decompose by the action of an un-deactivated catalyst to reduce its molecular weight and also to produce new instable terminals. This results in a reduction of thermal stability.

The copolymerization reaction of the invention is carried out by, for example, bulk polymerization. The bulk polymerization can be effected in either a batch system or a continuous system. The bulk polymerization is usually performed in such a manner that monomers in a molten state are used and a solid massive polymer is obtained with the progress of the polymerization. Polymerization apparatus for use in the present invention include, for batchwise polymerization, a commonly employed reaction tank equipped with a stirrer and, for continuous polymerization, a co-kneader and a self-cleaning type mixer, e.g., a twin-screw continuous extruder and a twin-paddle continuous mixer. Two or more different types of apparatuses can be used in combination.

The copolymerization is carried out under atmospheric pressure, preferably at a temperature of from 60° to 200° C., still preferably from 60° to 120° C. The polymerization time is not particularly limited, but it is usually from 10 seconds to 100 minutes.

The bulky or powdery polyoxymethylene copolymer ejected from the polymerization apparatus is usually heated at a temperature below the melting point together with a catalyst deactivator to thereby deactivate the catalyst and vaporize unreacted monomers, or poured into an aqueous solution or an organic solvent each containing a catalyst deactivator to neutralize the catalyst, followed by filtration and drying at a temperature below the melting point. Alternatively, the ejected polymer is heated at a temperature below the melting point in an inert gas atmosphere to thereby reduce the catalyst by evaporation without deactivating the catalyst, and the thus treated polymer is then subjected to terminal stabilization treatment described below. The above-described treatments are preferably conducted after once grinding the polyoxymethylene copolymer that is ejected from the polymerization apparatus.

Useful catalyst deactivators for use in the present invention include basic substances, such as ammonia, amines (e.g., triethylamine and tributylamine) and hydroxides, inorganic weak acid salts or organic acid salts of an alkali metal or an alkaline earth metal.

The thus recovered polyoxymethylene copolymer is then subjected to terminal stabilization treatment because a polyoxymethylene copolymer has instable terminals having a structure of $-(OCH_2)-OH$ which are susceptible to so-called zipper decomposition upon heating, and also because some parts of the catalyst remain non-deactivated. The terminal stabilization treatment can be carried out in a conventional manner. For example, the copolymer is melted in a vented single- or twin-screw extruder to thereby hydrolyze the instable terminals with a basic substance into stable terminals and also to deactivate the catalyst still remaining active. Subsequently, the unreacted monomers which are contained in a polyoxymethylene copolymer before the terminal stabilization treatment, formaldehyde which results from the melt-hydrolysis of the instable terminals, etc. are removed through the vent under reduced pressure. Thereafter, the copolymer is pelletized to obtain a polyoxymethylene copolymer as a final product. Stabilizers against decomposition with heat, light, oxidation, etc. and other additives may be added to the copolymer. The addition of the stabilizers and other additives may be carried out at the same time with above-described terminal stabilization treatment.

When the polyoxymethylene has a large amount of instable terminals, the instable terminals cannot be sufficiently removed by a usual treatment in an extruder. When the decomposition of the polyoxymethylene copolymer by the action of the catalyst or by oxidation is considerable, the copolymer decomposes in an extruder and produces new instable terminals. Therefore, in order to obtain a stable polyoxymethylene copolymer as a final product, the polyoxymethylene copolymer that is subjected to the above-described terminal stabilization treatment is required to have high thermal stability (i.e., required to have a reduced instable terminal content and to be less susceptible to decomposition by the catalyst or oxidative decomposition). This has been achieved by the present invention.

The basic substance for use in the terminal stabilization treatment include ammonia and aliphatic amine compounds such as triethylamine and tributylamine. Other useful basic substances include hydroxides, inorganic weak acid salts and organic acid salts of an alkali metal or an alkaline earth metal. Ammonia and amine compounds such as triethylamine and tributylamine are particularly preferred.

The basic substance for use in the terminal stabilization treatment is generally added in an amount of from 0.01 to 5% by weight based on the weight of the polyoxymethylene copolymer in the case of using a amine compound, or in an amount of from 2 to 5000 ppm in the case of using a hydroxide, inorganic weak acid salt or organic acid salt of an alkali metal or an alkaline earth metal. Water and/or an organic solvent can be added together with the basic substance.

In order to ensure the stability of the polyoxymethylene copolymer through the terminal stabilization treatment, it is preferable for the polyoxymethylene copolymer to be stabilized to have an instable terminal content of not more than 3000 ppm. Because the instable terminals are produced during polymerization by trace impurities having an active hydrogen (hydrogen of OH) such as water, methyl alcohol and formic acid, which is present in the raw material such as trioxane and 1,3-dioxolane, it is necessary for reducing the instable terminal content that the concentrations of the trace impurities having an active hydrogen such as water, methyl alcohol and formic acid, in the raw materials such as trioxane and 1,3-dioxolane be reduced as much as possible by distillation, adsorption and the like. In order to reduce the instable terminal content to 3000 ppm or lower, the total concentration of the trace impurities having an active hydrogen should be reduced to 20 ppm or less, as converted to a water concentration, based on the total amount of trioxane and 1,3-dioxolane. Conversion to a water concentration can be made by multiplying the methyl alcohol concentration by 0.28 and the formic acid concentration by 0.20. If the instable terminal content exceeds 3000 ppm, the terminal stabilization treatment must be conducted twice or more times for accomplishing terminal stabilization completely, which unfavorably necessitates using large-scaled equipment.

EXAMPLES

The present invention will be described in detail with reference to the following Examples and comparative Examples, but it should be understood that the invention is not to be construed as being limited thereto.

In Examples and Comparative Examples various characteristics were determined as follows.

(1) 2-Methyl-1,3-dioxolane Content and Methyl Alcohol Content:

These contents were measured using a gas chromatograph equipped with a glass column packed with Gaschro Pack 55 (G.L. Science K.K.) and detected with a hydrogen flame ion detector.

(2) Peroxide Content in 1,3-Dioxolane (as converted to hydrogen peroxide content):

In a flask were put 40 ml of isopropyl alcohol, 10 ml of a saturated solution of sodium iodide in isopropyl alcohol, 2 ml of acetic acid and 25 g of 1,3-dioxolane, and the mixture was refluxed at 100° C. for about 5 minutes. Immediately thereafter, the mixture was titrated with 0.01N sodium thiosulfate until the yellow mixture in the flask became colorless (the titer was taken as A ml). As blank titration, the same procedure was followed but by using no 1,3-dioxolane (the titer was taken as B ml). The peroxide amount, in terms of hydrogen peroxide, in the 1,3-dioxolane was obtained from the following equation.

$$\text{Peroxide content (in terms of hydrogen peroxide; ppm)} = ((A-B) \times 17 \times 0.01)/(25 \times 1000) \times 10^6$$

(3) Polymerization Yield:

After polymerization, the resulting polyoxymethylene copolymer was dried and weighed, and the weight percentage of it to the weight of the total charged monomers was obtained.

(4) Melt Index (MI; g/10 min):

Melt index was measured with MELT INDEXER manufactured by Toyo Seiki K.K. under conditions of 190° C. and 2169 g according to ASTM D1238.

(5) Instable Terminal Content:

A polyoxymethylene copolymer was treated at 200° C. for 50 minutes in a nitrogen stream, under which conditions decomposition of only the instable terminals of the copolymer is induced. Formaldehyde generated in the above treatment was absorbed in water and titrated. The smaller the titre, the higher the thermal stability of the copolymer.

(6) Time for 5% Weight Loss on Heating at 230° C. in Air:

A thermobalance manufactured by Rigaku Denki K.K. was used. A polyoxymethylene copolymer sample weighing 50 mg was put in an electric oven and heated from 40° C. at a rate of 20° C./min while feeding 5 Nl/hr of air. After the temperature reached 230° C., the time (min) required for the sample to lose its weight by 5% was measured. The longer the weight loss time, the higher the thermal stability of the copolymer.

Unless otherwise indicated, all parts, percents and ppm are given by weight.

EXAMPLE 1

1,3-Dioxolane having a 2-methyl-1,3-dioxolane content of 50 ppm (as measured by gas chromatography) and a peroxide content (in terms of hydrogen peroxide, hereinafter the same) of 1.2 ppm and containing 200 ppm, based on the 1,3-dioxolane, of tetrakis(methylene(3,5-di-t-butyl-4-hydroxyhydrocinnamate))methane (Irganox 1010, produced by Ciba-Geigy, Ltd.) added thereto as a hindered phenol was used. The mixture of trioxane and the 1,3-dioxolane had a water concentration of 5 ppm (as measured according to a Karl Fischer's method), a formic acid concentration of 1 ppm (as measured by neutralization titration with potassium hydroxide) and a methyl alcohol concentration of 10 ppm (as measured by gas chromatography), giving a total concentration of 8 ppm in terms of water concentration. The above described materials were copolymerized as follows.

A 5 l kneader equipped with two stirring blades and a jacket through which a heat transfer medium could be circulated was conditioned at 80° C. under atmospheric pressure. In the kneader were charged 2 kg of trioxane, 4.2 mol %, based on mol of trioxane, of 1,3-dioxolane, and 1×10$^{-3}$ mol, per mole of trioxane, of methylal as a molecular weight regulator, followed by mixing. To the mixture was added a 1% cyclohexane solution of boron trifluoride butyl etherate in an amount of 1.5×10$^{-5}$ mol per mole of the total monomers to start polymerization. After conducting polymerization reaction for 30 minutes, 2 l of a 0.1% aqueous solution of tributylamine was added to the kneader to deactivate the catalyst to thereby terminate the reaction. After stirring the reaction mixture at 80° C. for an additional 1 hour, the reaction mixture was withdrawn and filtered to collect a polyoxymethylene copolymer. The product was dried at 120° C. The polymerization yield was 87%.

The resulting polyoxymethylene copolymer was fed to a twin-screw extruder equipped with a vent having a diameter of 30 mm together with 0.3 part of 2,2'-methylenebis(4-methyl-6-t-butylphenol) as an antioxidant per 100 parts of the copolymer to carrying out terminal stabilization at a revolution speed of 100 rpm and a temperature of 200° C. As a basic substance for terminal stabilization, an aqueous triethylamine solution was continuously added, to the copolymer molten in front of the terminal stabilization zone of the extruder, in an amount of 3 parts (1 part of triethylamine in 2 parts of water) per 100 parts of the copolymer. The thus terminal-stabilized polyoxymethylene copolymer was degassed through the vent hole provided in the rear of the terminal stabilization zone at a degree of vacuum of 30 Torr (at the vent). The copolymer was extruded into strands through a die portion of the extruder and pelletized.

The MI, instable terminal content and 5% weight loss time (230° C., air) of the thus obtained polyoxymethylene copolymer are shown in Table 1 below.

Examples 2 To 7

The same procedures as in Example 1 were followed, except that the 1,3-dioxolane used in Example 1 was changed with one having a 2-methyl-1,3-dioxolane content, a peroxide content and a hindered phenol content as shown in Table 1. The results obtained are shown in Table 1.

Examples 8 To 9

The same procedures as in Example 1 were followed, except that the amount of the catalyst was changed as shown in Table 1. The results obtained are shown in Table 1.

Example 10

A polymerization reaction was started and continued for 30 minutes in the same manner as in Example 1. Subsequently, a heat transfer medium of 140° C. was circulated through the jacket of the kneader to dry the polyoxymethylene copolymer in the kneader in a nitrogen stream for 60 minutes, followed by taking it out of the kneader. The polymerization yield was 86%. The thus obtained copolymer was post-treated in the same manner as in Example 1. The results obtained are shown in Table 1.

Example 11

The same procedures as in Example 1 were followed, except that the water concentration of the mixture of trioxane and 1,3-dioxolane was changed to 12 ppm, a formic acid concentration to 2 ppm, and a methyl alcohol concentration to 20 ppm, giving a total concentration of 18 ppm in terms of water concentration. The results obtained are shown in Table 1.

Comparative Examples 1 To 6

The same procedures as in Example 1 were followed, except that the 1,3-dioxolane used in Example 1 was changed with ones having a 2-methyl-1,3-dioxolane content, a peroxide content and a hindered phenol content as shown in Table 2, respectively. The results obtained are shown in Table 2.

TABLE 1

| | 1,3-Dioxolane Monomer | | | Amount of | | | | |
| --- | --- | --- | --- | --- | --- | --- | --- | --- |
| Example No. | 2-Methyl-1,3-dioxolane Content (ppm) | Peroxide Content* (ppm) | Hindered Phenol (Irganox 1010) Content (ppm) | Catalyst (×10$^{-5}$) (mol/mol-total monomers) | Polymerization Yield (%) | MI (g/10 min) | Instable Terminal Content (ppm) | Time for 5% Weight Loss (230° C., air) (min) |
| 1 | 50 | 1.2 | 200 | 1.5 | 87 | 9.4 | 300 | 62 |
| 2 | 280 | 1.5 | 200 | 1.5 | 87 | 9.3 | 400 | 57 |
| 3 | 120 | 4.8 | 100 | 1.5 | 88 | 9.4 | 500 | 55 |
| 4 | 130 | 0.9 | 450 | 1.5 | 85 | 9.6 | 550 | 55 |
| 5 | 460 | 1.3 | 50 | 1.5 | 86 | 9.7 | 800 | 48 |
| 6 | 160 | 12 | 100 | 1.5 | 88 | 9.4 | 600 | 47 |
| 7 | 450 | 13 | 470 | 1.5 | 85 | 9.8 | 900 | 45 |
| 8 | 50 | 1.2 | 200 | 1.2 | 80 | 10.5 | 200 | 65 |
| 9 | 50 | 1.2 | 200 | 2.0 | 95 | 8.7 | 600 | 57 |
| 10 | 50 | 1.2 | 200 | 1.5 | 86 | 9.5 | 100 | 69 |
| 11 | 50 | 1.2 | 200 | 1.5 | 87 | 9.4 | 800 | 59 |

Note:
*Peroxide content in terms of hydrogen peroxide.

TABLE 2

| Comparative Example No. | 1,3-Dioxolane Monomer | | | Amount of Catalyst (×10⁻⁵) (mol/mol-total monomers) | Polymerization Yield (%) | MI (g/10 min) | Instable Terminal Content (ppm) | Time for 5% Weight Loss (230° C., air) (min) |
|---|---|---|---|---|---|---|---|---|
| | 2-Methyl-1,3-dioxolane Content (ppm) | Peroxide Content* (ppm) | Hindered Phenol (Irganox 1010) Content (ppm) | | | | | |
| 1 | 820 | 0.9 | 100 | 1.5 | 70 | 22.3 | 3400 | 27 |
| 2 | 110 | 34 | 200 | 1.5 | 65 | 29.4 | 4100 | 24 |
| 3 | 130 | 1.2 | 700 | 1.5 | 63 | 28.6 | 3700 | 37 |
| 4 | 140 | 41 | 800 | 1.5 | 55 | 32.4 | 5300 | 20 |
| 5 | 760 | 32 | 200 | 1.5 | 60 | 41.7 | 6300 | 15 |
| 6 | 80 | 39 | 0 | 1.5 | 64 | 31.5 | 3900 | 28 |

Note:
*Peroxide content in terms of hydrogen peroxide.

As is apparent from the results shown in Table 1, polyoxymethylene copolymers having high thermal stability are provided according to the present invention.

While the invention has been described in detail and with reference to specific examples thereof, it would be apparent to one skilled in the art that various changes and modifications can be made therein without departing from the spirit and scope thereof.

What is claimed is:

1. A polyoxymethylene copolymer prepared by copolymerizing a mixture comprising trioxane and 1,3-dioxolane in the presence of at least one polymerization catalyst selected from the group consisting of boron trifluoride, a boron trifluoride hydrate and a coordination complex compound of an organic compound containing an oxygen atom or a sulfur atom with boron trifluoride, wherein said 1,3-dioxolane has a 2-methyl-1,3-dioxolane content of not more than 500 ppm by weight and a 1,3-dioxolane peroxide content of not more than 15 ppm by weight in terms of hydrogen peroxide, and contains at least one hindered phenol in an amount of from 10 to 500 ppm by weight, each based on the weight of said 1,3-dioxolane.

2. The polyoxymethylene copolymer according to claim 1, wherein said 2-methyl-1,3-dioxolane content is not more than 300 ppm by weight.

3. The polyoxymethylene copolymer according to claim 1, wherein said mixture of trioxane and 1,3-dioxolane further comprises water, formic acid and methyl alcohol in a total concentration thereof in the mixture of not more than 20 ppm in terms of water concentration.

4. The polyoxymethylene copolymer according to claim 1, wherein said polymerization catalyst is used in a concentration of from $5 \times 10^{-6}$ to $2 \times 10^{-5}$ mol per mole of said mixture of trioxane and 1,3-dioxolane.

* * * * *

UNITED STATES PATENT AND TRADEMARK OFFICE
CERTIFICATE OF CORRECTION

PATENT NO.    :   5,837,781

DATED         :   November 17, 1998

INVENTOR(S)   :   Tanimura et al.

It is certified that error appears in the above-identified patent and that said Letters Patent is hereby corrected as shown below:

On the title page, item [30], "8-0544442" should be changed to --8-054442--.

Signed and Sealed this

First Day of June, 1999

Attest:

Q. TODD DICKINSON

*Attesting Officer*    *Acting Commissioner of Patents and Trademarks*